(12) United States Patent
Yamaji

(10) Patent No.: US 6,417,887 B1
(45) Date of Patent: Jul. 9, 2002

(54) IMAGE DISPLAY PROCESSING APPARATUS AND METHOD FOR CONVERTING AN IMAGE SIGNAL FROM AN INTERLACED SYSTEM TO A PROGRESSIVE SYSTEM

(75) Inventor: Hirotaka Yamaji, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/440,142

(22) Filed: Nov. 15, 1999

(30) Foreign Application Priority Data

Nov. 13, 1998 (JP) .......................................... 10-338419

(51) Int. Cl.$^7$ ............................................. H04N 11/20
(52) U.S. Cl. ........................ 348/452; 348/910; 348/447
(58) Field of Search ................................ 348/448–452, 348/447, 910, 443

(56) References Cited

U.S. PATENT DOCUMENTS

| | | | | |
|---|---|---|---|---|
| 4,539,592 A | * | 9/1985 | Tanaka et al. ............... | 358/140 |
| 4,987,489 A | * | 1/1991 | Hurley et al. ............... | 358/105 |
| 5,488,422 A | * | 1/1996 | Faroudja et al. ............. | 348/448 |
| 5,534,935 A | * | 7/1996 | Kawai et al. ................ | 348/448 |
| 5,602,591 A | * | 2/1997 | Saiki .......................... | 348/452 |
| 5,619,273 A | * | 4/1997 | Sugiyama .................... | 348/452 |
| 5,936,676 A | * | 8/1999 | Ledinh et al. ............... | 348/452 |
| 6,262,773 B1 | * | 7/2001 | Westerman .................. | 348/448 |

FOREIGN PATENT DOCUMENTS

| JP | 7-168555 | 7/1995 |
|---|---|---|
| JP | 10-98692 | 4/1998 |

* cited by examiner

*Primary Examiner*—Victor R. Kostak
(74) *Attorney, Agent, or Firm*—Foley & Lardner

(57) ABSTRACT

An image processing display apparatus for converting an image signal of an interlace system into a progressive scanning system and displaying an image, having means for conducting low band frequency passing processing so as to reduce flicker for a vertical direction signal component of a still picture signal component included in a video image signal, and means for synthesizing a still picture signal component to which the low band frequency passing processing is applied and a moving picture signal component included in the above-described video image signal to generate a progressive signal.

12 Claims, 4 Drawing Sheets

IMAGE DISPLAY PROCESSING APPARATUS AND METHOD FOR CONVERTING AN IMAGE SIGNAL FROM AN INTERLACED SYSTEM TO A PROGRESSIVE SYSTEM

BACKGROUND OF THE INVENTION

The present invention relates to an art of an image display, and particularly to image display processing which provides a obvious image and good image quality in an information instrument and apparatus such as a PC (personal computer) apparatus that needs a display by means of a progressive scanning system, and particularly to optimum image display processing apparatus and image display processing method which are used in case that a video image signal in a interlace system is handled as a video signal in progressive scanning system.

Presently, for example, in an NTSC (National Television System Committee) system, since an image signal of the interlace system is constructed of repetition scanning lines, movement of a moving picture smoothes, and an obvious image is provided. However, in case of displaying a still picture using an image signal of the interlace system, since images of odd and even fields are alternately displayed, a flicker occurs and a restless image becomes to be frequently displayed.

On the other hand, a high quality TV and an image receiver by means of the progressive scanning system are put to practical use, improvement of quality of an image becomes to be essential.

FIG. 4 is a block diagram of one example of an image display processing circuit (the first prior art) by means of a conventional interlace system (JP-A-168555/1995). Particularly, in the progressive scanning system conducted in the image display processing circuit of the first prior art, in case that a moving picture is detected out of motion of an image, only image signal information of one field is sequentially scanned on a screen at a speed two times as large as an usual case, and an image is displayed. Also, in case of a still picture is detected out of motion of an image, each image signal information of an odd field and an even field is sequentially scanned at a speed two times as large as an usual case, and an image is displayed. Thereby, even for the still picture, occurrence of a line flicker is suppressed.

Conventionally, as this kind of the image display apparatus, there is an apparatus disclosed in JP-A98692/1998 (the second prior art), for example. Particular, the image display apparatus of the second prior art is for converting an image signal of the interlace system into a progressive scanning system, and displaying an image, and in the image display apparatus which is constructed so as to control a switch between field interpolation for outputting a data of a pixel at the same position in one field before onto a line to be interpolated and line interpolation for outputting a data of a pixel included in any one of upper and lower lines adjacent to the line to be interpolated onto the line, based on a motion detection result of motion detection means for conducting level comparison every pixel at the same position between frames different from each other, the following arrangement is adopted. In other words, the motion detection means is arranged so as to conduct level comparison every pixel at the same position in at least a plurality of frames before and behind, and detect whether or not there is motion. In this arrangement, since an interval for the motion detection is longer than conventional one, a phenomenon that the field interpolation and the line interpolation are frequently switched is suppressed, and flicker of a display pixel is reduced. Especially, the motion detection means can be arranged so as to include level comparison means for conducting level comparison every pixel at the same position in one frame before and behind, delay means for delaying a comparison result of this level comparison means by at least one frame, and logic means for outputting a signal for selecting the field interpolation only in case that both an output result of the above-described level comparison means and an output result of the above described delay means are a determination result of "no motion", and for selecting the line interpolation in other cases. Especially, the delay means can be constructed of a field memory and the logic means can be constructed of an AND gate, respectively. Thereby, it is disclosed that, since an interval for determining "whether or not there is motion" is longer than conventional one, even though there are a noise and so forth which are superimposed on an image signal, a determination result of "whether or not there is motion" due to influence by this is not frequently switched, and as a result, occurrence of a task that, as conventional, a luminance level changes due to a difference of an interpolation method of the field interpolation and the line interpolation, and a displayed image flickers and image quality is deteriorated is dissolved.

However, in the image display processing circuit of the conventional interlace system, there are many cases in which, when a still picture (a character information data, for example) is displayed, it cannot be displayed by means of the progressive scanning system without flicker, and as a result, even for a still picture, since only an image of one field is outputted and displayed, there is a task that vertical resolution becomes to be half or a value close thereto.

On the other hand, in case of using an identifying signal for showing motion information representing a still picture/a moving picture, for example coded compressive information (compressive information such as an MPEG), an image display processing apparatus can be considered, in which the identifying signal for showing the motion information is put in header data information of the coded compressive information, and detection means for detecting the identifying signal for showing motion information within this header data information is provided.

However, in this image display processing apparatus, since it becomes to be necessary to insert a specific information data (motion information) and an identifying signal therefor into the coded compressive information, and a new transmitting/receiving device for discriminating the identifying signal becomes to be necessary, there is a task that reconstruction is needed on a current broadcasting infrastructure system.

SUMMARY OF THE INVENTION

Therefore, the objective of the present invention is to solve the above-described tasks.

Also, the objective of the present invention is to provide progressive scanning image display processing apparatus and image display processing method in which a still picture having high resolution is easily obtained, and even in progressive scanning display, smoothness of a moving picture image cannot be lost. In other words, the objective of the present invention is to provide progressive scanning image display processing apparatus and image display processing method in which, in case that a video image signal of the interlace system is displayed in progressive scanning, a still picture having high resolution is obtained, and even in progressive scan (double speed scan) display, smoothness of a moving picture image cannot be lost.

The objective of the present invention is accomplished by a progressive scanning image processing display apparatus for converting an image signal of an interlace system into a progressive scanning system and displaying an image, having means for conducting predetermined low band frequency pass processing so as to reduce flicker for a vertical direction signal component of a still picture signal component included in a video image signal, and means for synthesizing a still picture signal component to which the above-described low band frequency pass processing is applied and a moving picture signal component included in the above-described video image signal to generate progressive scanning.

Also, the above-described objective of the present invention is accomplished by a progressive scanning image processing display apparatus for converting an image signal of an interlace system into a progressive scanning system and displaying an image, having an image data memory processing section for generating a graphics image signal which is used for a display screen, a motion detecting circuit section for detecting motion information of a moving picture signal included in a video image signal of an interlace system, which is provided from an external device, a vertical direction low-pass filter for selecting a still picture signal included in the above-described video image signal based on the above-described motion information, and conducting predetermined low band frequency pass processing so as to reduce flicker for a vertical direction signal component of the above-described selected still picture signal and generating a progressive scan signal, a scan line switch for selectively switching the above-described still picture signal output from the above-described vertical direction low-pass filter and a moving picture signal which does not pass through the above-described vertical direction low-pass filter to each other based on the above-described motion information, and outputting it, a progressive scanning synthesis section for synthesizing the above-described still picture signal output from the above-described vertical direction low-pass filter and a moving picture signal that does not pass through the above-described vertical direction low-pass filter, which are output from said scan line switch, to generate a progressive scan signal, and a display section for displaying the above-described synthesized and generated progressive scan signal.

In addition, it is preferable that the above-described motion detecting circuit section has means for making a video signal field screen data generated by using the above-described video image signal to be a unit frame, and conducting difference processing of a current frame that is an up-to-date frame and a frame by one frame before from said current frame and generating one frame interval difference signal, and for conducting difference processing of a frame by one frame before from said current frame and a frame by two frames before from said current frame and generating one frame interval difference signal, and means for detecting the above-described motion information using two of the above-described one frame interval difference signal.

Also, it is preferable that the image processing display apparatus has a field memory for an image which stores the above-described current frame, a field memory for an image which stores a frame by one frame before from the above-described current frame, a field memory for an image which stores a frame by two frames before from the above-described current frame, two low frequency pass filters for conducting predetermined low band frequency pass processing so as to remove a predetermined color signal component from each of the above-described two of one frame interval difference signal, and a synthesis section for synthesizing the above-described motion information using an output from one of the above-described low frequency pass filters and an output from the other of the above-described low frequency pass filters.

Also, it is preferable that each of the above-described two low frequency pass filters includes means for conducting the above-described predetermined low band frequency pass processing so as to remove the above-described predetermined color signal component for a horizontal frequency signal component and a vertical frequency signal component of the above-described one frame interval difference signal which is input to each filter.

Also, it is preferable that the above-described vertical direction low-pass filter has a transversal type finite impulse response filter having a predetermined number of taps.

The above-described objective of the present invention is accomplished by an image display processing method of converting an image signal of an interlace system into a progressive scanning system and displaying an image, having a step including a predetermined low band frequency pass processing step so as to reduce flicker for a vertical direction signal component of a still picture signal component included in a video image signal, and a step of synthesizing a still picture signal component to which the above-described low band frequency pass processing is applied and a moving picture signal component included in the above-described video image signal to generate progressive scanning.

The above-described objective of the present invention is accomplished by an image display processing method of converting an image signal of an interlace system into a progressive scanning system and displaying an image, having an image data memory step of generating a graphics image signal which is used for a display screen, a motion detecting step of detecting motion information of a moving picture signal included in a video image signal of an interlace system, which is provided from an external device, a vertical direction low band frequency pass processing step of selecting a still picture signal included in the above-described video image signal based on the above-described motion information, and conducting predetermined low band frequency pass processing so as to reduce flicker for a vertical direction signal component of the above-described selected still picture signal and generating a progressive scan signal, a scan line switch step of selectively switching the above-described still picture signal output from the above-described vertical direction low band frequency pass processing step and a moving picture signal which does not pass through the above-described vertical direction low band frequency pass processing step to each other based on the above-described motion information, and outputting it, a progressive scanning synthesis step of synthesizing the above-described still picture signal output from the above-described vertical direction low band frequency pass processing step and a moving picture signal which does not pass through the above-described vertical direction low band frequency pass processing step, which are output from the above-described scan line switch step, and generating a progressive scan signal, and a display step of displaying the above-described synthesized and generated progressive scan signal.

Also, it is preferable that the above-described motion detecting step has steps of making a video signal field screen data generated by using the above-described video image signal to be a unit frame, and conducting difference processing of a current frame that is an up-to-date frame and a frame by one frame before from the above-described current frame and generating one frame interval difference signal, and conducting difference processing of a frame by one frame before from the above-described current frame and a frame by two frames before from the above-described current frame and generating one frame interval difference signal, and detecting the above-described motion information using two of the above-described one frame interval difference signal.

Also, it is preferable that the image display processing method has a first memory step for an image which stores the above-described current frame, a second memory step for an image which stores a frame by one frame before from the above-described current frame, a third memory step for an image which stores a frame by two frames before from the above-described current frame, two low band frequency pass processing steps including a predetermined low band frequency pass processing step so as to remove a predetermined color signal component from each of the above-described two of one frame interval difference signal, and a synthesis step of synthesizing the above-described motion information using an output from one of the above-described low band frequency pass processing steps and an output from the other of the above-described low band frequency pass processing steps.

Also, it is preferable that each of the above-described two low band frequency pass processing steps includes the above-described predetermined low band frequency pass processing step so as to remove the above-described predetermined color signal component for a horizontal frequency signal component and a vertical frequency signal component of the above-described one frame interval difference signal which is input to each step.

Also, it is preferable that the above-described vertical direction low band frequency pass processing step has a step of conducting transversal type finite impulse response filter processing which has a predetermined number of taps.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
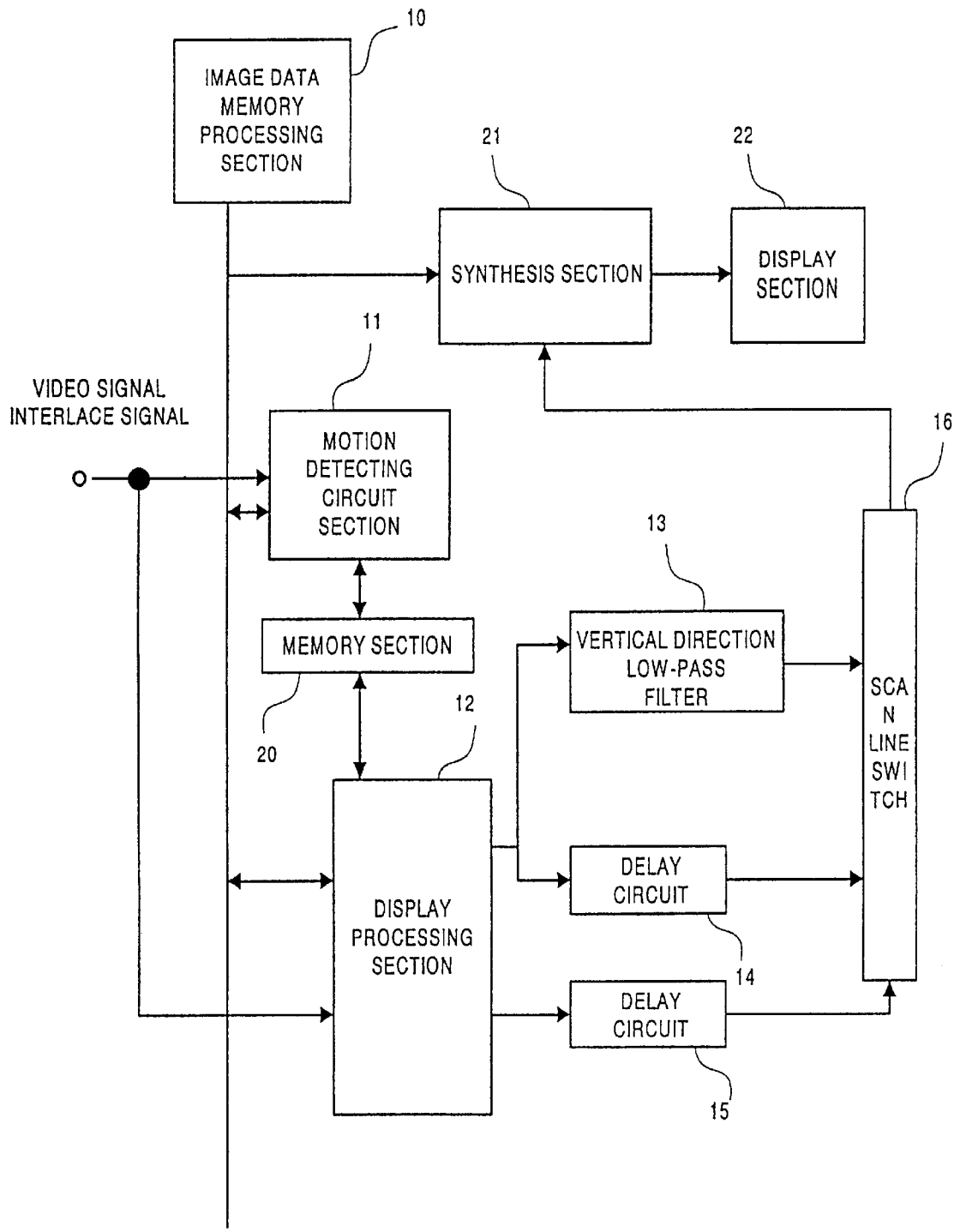
FIG. 1 is a block diagram of a terminal to which an image processing display apparatus of the present invention is applied.

Below, embodiments of the present invention will be explained in detail based on drawings. FIG. 1 is a block diagram of a terminal to which an image processing display apparatus of the present invention is applied. As shown in FIG. 1, the image processing display apparatus of the this embodiment comprises an image data memory processing section 10, a motion detecting circuit section 11, a display processing section 12, a vertical direction low-pass filter 13, delay circuits 14 and 15, a scan line switch 16, a memory section (field memory) 20, a synthesis section 21, and a display section 22.

The motion detecting circuit section 11 conducts a motion detecting step, and based on information of a video image signal (interlace signal) which is provided from an external device (not shown) such as a video deck, the motion detecting circuit section 11 detects motion information of a moving picture thereof.

The image data memory processing section 10 conducts an image data memory processing step, and generates image information for writing a graphics image signal which is used in a PC screen (personal computer screen) to a display system (particularly to the display section 22).

The motion information from the motion detecting circuit section 11 and the image information output from the image data memory processing section 10 are combined, and are input to the display processing section 12, respectively, as composite image data (a video image data and a graphics image data) which are displayed on condition that they are superposed on each other.

The display processing section 12 separates the motion information from the motion detecting circuit section 11 into the motion detecting information of an odd field and the motion detecting information of an even field, and stores them in the memory section (field memory) 20. In the same manner, the display processing section 12 separates the image information output from the image data memory processing section 10 into an image signal of an odd frame and an image signal of an even frame, and stores them in the memory section (field memory) 20.

The display processing section 12 supplies a data read from the memory section (field memory) 20 to each of the vertical direction low-pass filter 13, and the delay circuits 14 and 15 having line memories so as to process the data read from the memory section (field memory) 20 as a data of a progressive scanning system.

Operation of the image processing display apparatus of FIG. 1 will be explained below.

Detection signals of a moving picture/a still picture are generated, which were detected by the motion detecting circuit section 11 based on the video image signal (interlace signal) which was input from the external device (not shown) such as a video deck.

In case that the display processing section 12 determines that, based on the detection signals of the moving picture/the still picture, the video image signal (interlace signal) which was input from the external device such as a video deck is a still picture signal, it outputs the video image signal (still picture signal) to the vertical direction low-pass filter 13, which was input from the external device such as a video deck. In case that the display processing section 12 determines that, based on the detection signals of the moving picture/the still picture, the video image signal (interlace signal) which was input from the external device such as a video deck is a moving picture signal, it outputs the video image signal (moving picture signal) to the delay circuits 14 and 15 without making it pass through the vertical direction low-pass filter 13, which was input from the external device such as a video deck.

The data (moving picture signal) which does not pass through the vertical direction low-pass filter 13 is converted into a video signal (progressive signal) in the progressive scanning synthesis section 21, and is displayed in the display section 22.

The video image signal (still picture signal) which was input from the external device such as a video deck passes through the vertical direction low-pass filter 13, and is converted into a video signal (progressive signal) in the synthesis section 21 and is displayed in the display section 22. Thereby, the video image signal is converted into a still picture and a character image in which flicker for the video image signal input from the external device such as a video deck is reduced, and is displayed in the display section 22.

On the other hand, a region (in other words, a moving picture signal) other than the still picture signal in the video image signal which was input from the external device such as a video deck is output to the delay circuits 14 and 15 without passing through the vertical direction low-pass filter 13, and is converted into a video signal (progressive signal) in the synthesis section 21 and is displayed in the display section 22. Thereby, it becomes to be possible to display a video image screen in the display section 22 in a display by means of the progressive scanning system, in which resolution of the moving picture for the video image signal which was input from the external device such as a video deck is improved.

The delay circuits 14 and 15 of FIG. 1 conduct a time adjustment (synchronizing processing) between a data (still picture signal) and a video image signal (moving picture signal) output from the vertical direction low-pass filter 13 by delaying the video image signal (moving picture signal) by a time period same as a delay time period necessary for processing operation by means of the vertical direction low-pass filter 13 for conducting a vertical direction low band frequency pass processing step, and outputting it.

The scan line switch 16 which functions as a change-over switch section detects a flag included in the data (video image signal (moving picture signal)) output from the delay circuit 15, and during a time period when the flag is being detected, the data (still picture signal) output from the vertical direction low-pass filter 13 is selected and a progressive scan signal (display processing signal) is generated. On the other hand, during a time period when the flag is not being detected, the data (video image signal (moving picture signal)) output from the delay circuit 14 is selected and a progressive signal (display processing signal) is generated.

In other words, the scan line switch 16 conducts a scan line switching step, and selects a still picture data and a character data which were output from the vertical direction low-pass filter 13 at a character display position in the video image signal and selects a data (moving picture signal) which was output from the delay circuit 14 and did not pass through the vertical direction low-pass filter 13 at a position other than the character display position in the video image signal, and generates the progressive signal (display processing signal).

The synthesis section 21 conducts a synthesis step, and generates a display processing signal (progressive signal) in which the progressive signal (display processing signal) that includes any one of the data (still picture signal) output from the vertical direction low-pass filter 13 and the data (moving picture signal) that was output from the delay circuit 14 and did not pass through the vertical direction low-pass filter 13, and the graphics image signal output from the image data memory processing section 10 are synthesized.

This display processing signal from the scan line switch 16 is a progressive signal in which any one of the data (still picture signal) output from the vertical direction low-pass filter 13 and the data (moving picture signal) that was output from the delay circuit 14 and did not pass through the vertical direction low-pass filter 13 is selected. This progressive signal is synthesized with the graphics image signal output from the image data memory processing section 10 through the synthesis section 21, and is output to the display section 22 as a display processing signal (progressive signal).

The display section 22 conducts a display step, and is arranged at the next stage of the synthesis section 21, and displays a display processing signal (progressive signal) from the synthesis section 21. Thereby, it becomes to be possible to take out an image signal, which does not affect a frame scan frequency signal of the progressive scanning system, and to display an image having image quality in which resolution is maintained.

In this manner, by using a video image signal of the interlace system and detecting motion information representing a moving picture/a still picture, and conducting display control for a display scan of an image data based on a detection signal of this motion information, it becomes to be possible to display a still picture without flicker and without losing display resolution for not only a moving picture but also a still picture. Furthermore, when a moving picture is displayed, line interpolation is enhanced, and it becomes to be possible to smoothly display a motion of a frame image. Also, it becomes to be possible to easily obtain a still picture having high resolution, and even in a display by means of the progressive scanning system, smoothness of a moving picture image cannot be lost. In other words, in case of displaying the video image signal of the interlace system by means of the progressive scanning system, it becomes to be possible to obtain a still picture having high resolution and to display the video image signal without losing smoothness of a moving picture image even in the display by means of the progressive scanning system.

Figure 2:
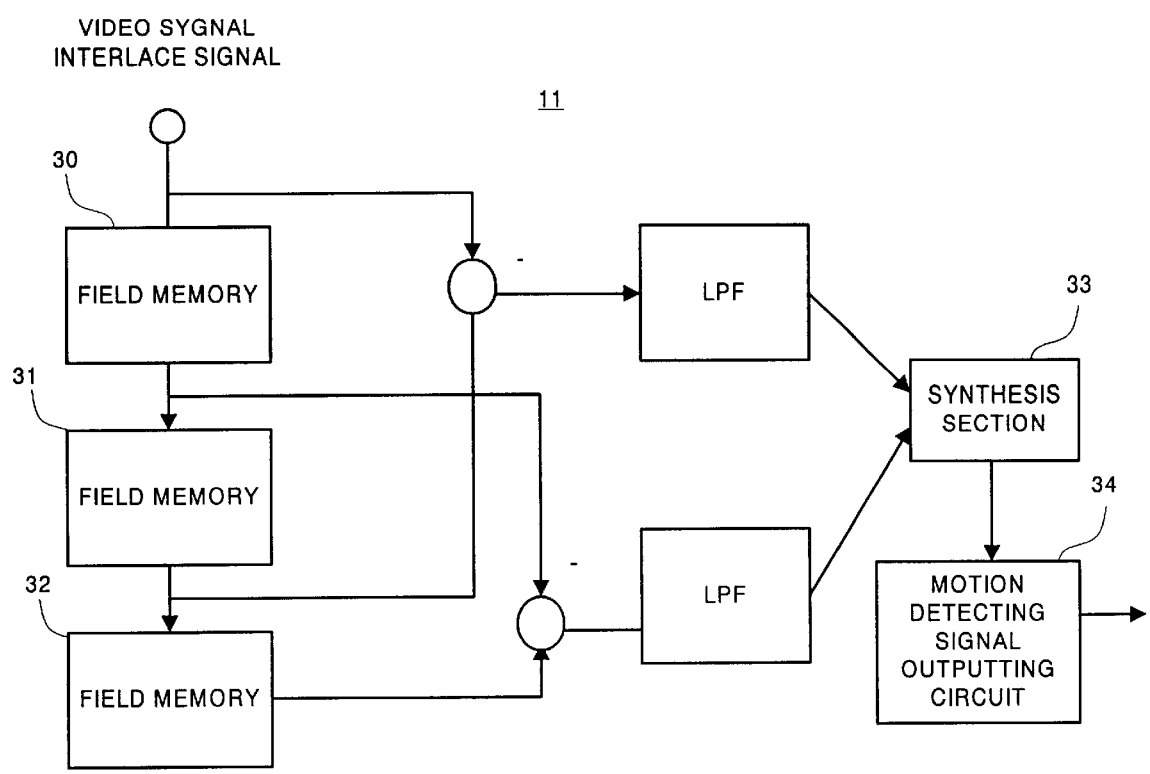
FIG. 2 is a block diagram showing one embodiment of a motion detecting circuit section of the present invention.

FIG. 2 is a functional block diagram showing one embodiment of the motion detecting circuit section 11 of the present invention. The motion detecting circuit section 11 includes field memories 30, 31 and 32 for an image, a synthesis section 33, a motion detecting signal outputting circuit 34, and two low-pass filters (LPFs).

As shown in FIG. 2, each of the field memories 30, 31 and 32 for an image stores a video image signal (interlace signal) therein as a video signal field screen data, which was input from the external device such as a video deck.

In this embodiment, in order to prevent occurrence of an omission of detection in a case in which motion is fast, a motion detecting method is used, in which not only a difference between a current frame and a frame by one frame before from the current frame, but also a difference between the frame by one frame before and a frame by further one frame before (a frame by two frames before from the current frame) are used together.

For realizing such a motion detecting method, the motion detecting circuit section 11 conducts difference processing of the video signal field screen data (a frame by one frame before from the current frame) output from the field memory 30 for an image and the video signal field screen data (a frame by two frames before from the current frame) output from the field memory 32 for an image, and generates one frame interval difference signal, and outputs this difference result to one of the LPFs (low frequency pass filters) connected to the next stage thereof and eliminates a color signal component.

Similarly, the motion detecting circuit section 11 conducts difference processing of the video image signal (the current frame) input from the external device such as a video deck and the video signal field screen data (a frame by one frame before from the current frame) output from the field memory 31 for an image, and generates one frame interval difference signal, and outputs this difference result to the other of the LPFs (low frequency pass filters) connected to the next stage thereof and eliminates a color signal component.

Also, in this embodiment, the LPFs are applied to not only a horizontal frequency signal component of the one frame interval difference signal, but also a vertical frequency signal component of this one frame interval difference signal. Thereby, capacities of elimination of the color signal component is improved.

An output from one of the LPFs (low frequency pass filters) and an output from the other of the LPFs are output to the synthesis section 33 connected to the next stage of the two LPFs. The synthesis section 33 conducts synthesis of motion information using the output from one of the LPFs (low frequency pass filters) and the output from the other of the LPFs. The motion detecting signal outputting circuit 34 arranged at the next stage of the synthesis section 33 outputs the motion information (a control signal) in accordance with the synthesis processing in the synthesis section 33.

Next, referring to FIG. 2, operation of the motion detecting circuit section 11 will be explained. In this embodiment, it is comprising the following fact is utilized: wide band motion in a time frequency region can be detected best based on a difference of one frame (which is constructed of two fields of an odd field and an even field) interval of image data generated from the video image signal (interlace signal) which was input from the external device such as a video deck.

In this embodiment, the difference (one frame interval difference signal) of one frame (which is constructed of two fields of an odd field and an even field) interval of image data generated from the video image signal (interlace signal) which was input from the external device such as a video deck is generated by conducting the difference processing for each of the field memories 30, 31 and 32 for an image. The color signal component is eliminated by making this one frame interval difference signal pass through the LPFs.

Here, when a cut-off frequency of the LPFs is made to be too low, it becomes to be difficult to detect motion such as a small object and a pattern or design (for example, fireworks and water spray), and also, when the cut-off frequency of the two LPFs is made to be so high, to the contrary, there is a possibility that a noise component is regarded as motion, and errors (cases in which a noise component is regarded as motion) of detection increases, and accordingly, in this embodiment, the cut-off frequency of the LPFs is set to a proper value.

Also, in this embodiment, the LPFs are applied to not only a horizontal frequency signal component of the one frame interval difference signal, but also a vertical frequency signal component of this one frame interval difference signal. Thereby, capacities of elimination of the color signal component is improved.

Figure 3:
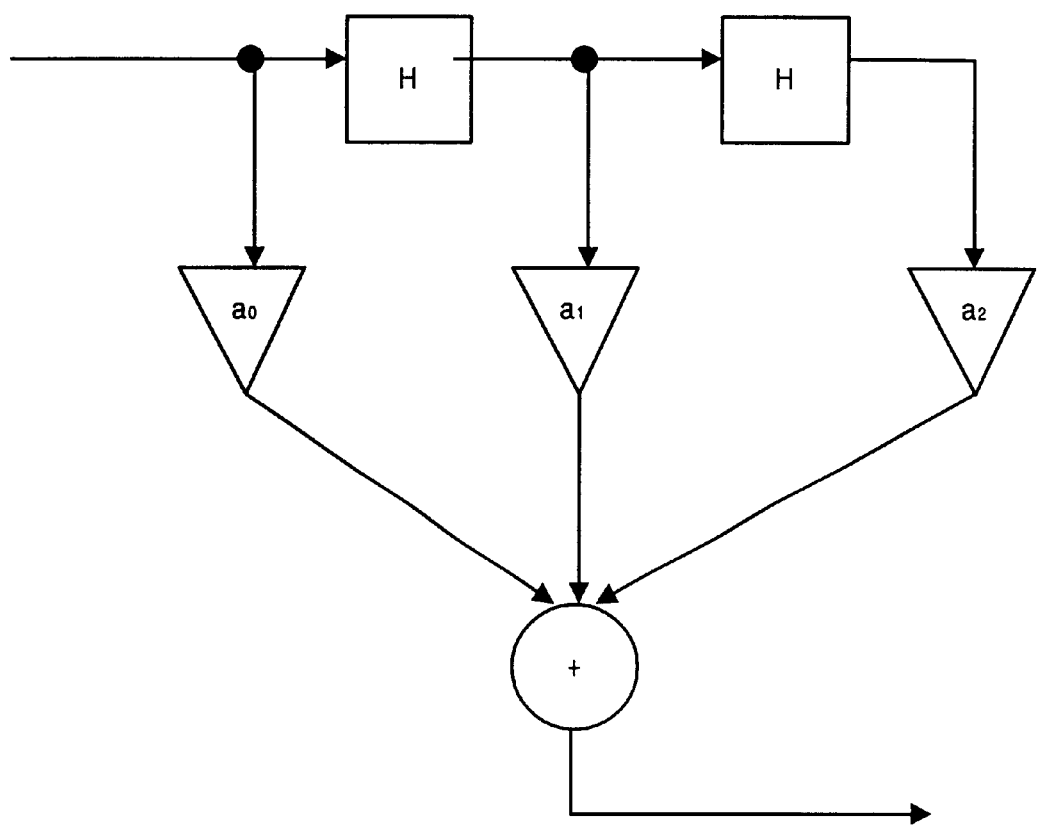
FIG. 3 is a block diagram showing an FIR filter having a three-taps transversal type arrangement, which is one embodiment of a vertical direction low-pass filter of FIG. 1.
Figure 4:
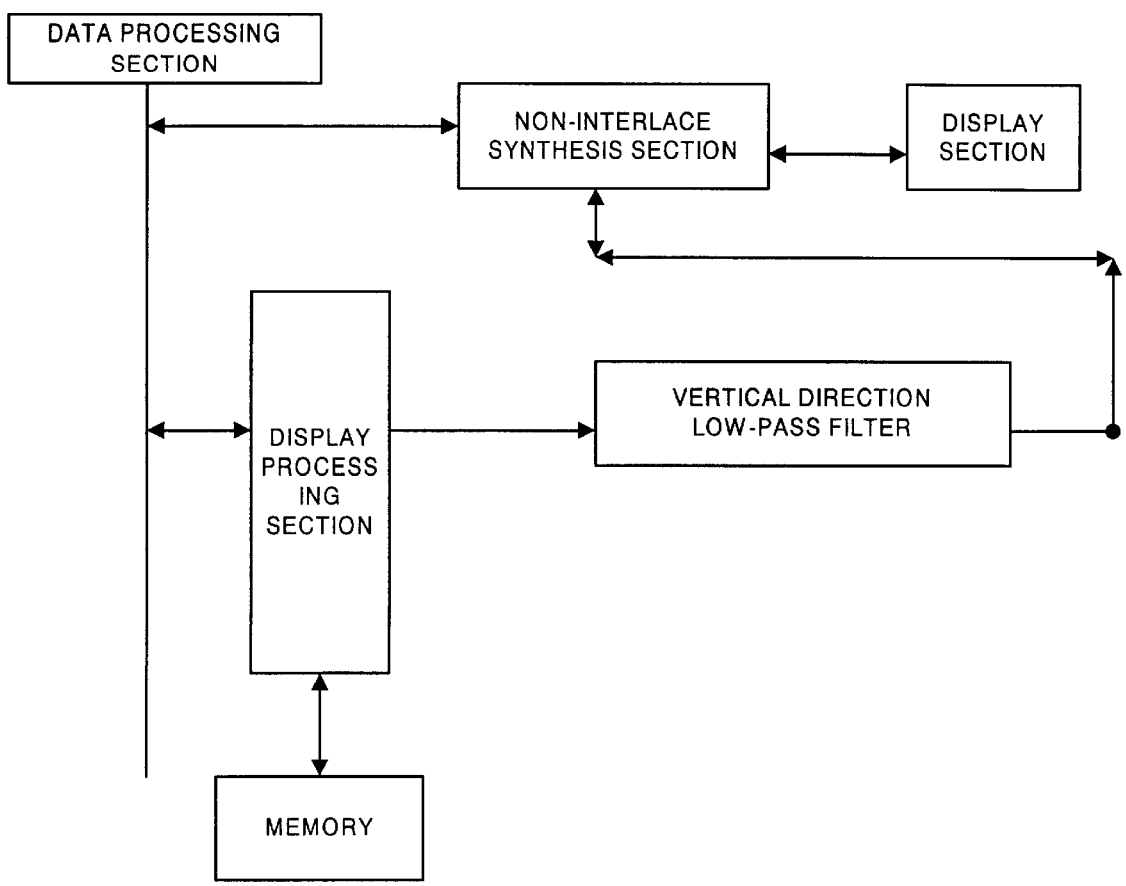
FIG. 4 is a block diagram of one embodiment of a conventional image display processing circuit of an interlace system.

FIG. 3 is a functional block diagram showing an FIR filter having a three-taps transversal type arrangement, which is one embodiment of the vertical direction low-pass filter 13 of FIG. 1. The vertical direction low-pass filter 13 shown in FIG. 3 is a three-taps transversal type FIR filter (Finite Impulse Response filter).

The FIR filter used here is a digital filter of which a continuous time period of impulse response is finite, and needs more than or equal to three taps such as 3, 5, 7, . . . Also, for a delay circuit, a device of 1H delay or a delay circuit in which a vertical synchronizing signal is adopted for a clock pulse can be used.

By providing such a vertical direction low-pass filter 13, it becomes to be possible to display a still picture without flicker and without losing display resolution for not only a moving picture but also a still picture. Furthermore, when a moving picture is displayed, line interpolation is enhanced, and it becomes to be possible to smoothly display a motion of a frame image. Also, it becomes to be possible to easily obtain a still picture having high resolution, and even in a display by means of the progressive scanning system, smoothness of a moving picture image cannot be lost. In other words, in case of displaying the video image signal of the interlace system by means of the progressive scan, it becomes to be possible to obtain a still picture having high resolution and to display the video image signal without losing smoothness of a moving picture image even in the display by means of the progressive scanning system.

In addition, in this embodiment, the present invention is not limited to an information instrument and device such a PC device, and can be widely applied to a video (image) display, a graphics display and so forth which are preferable in applying the present invention. Also, the number, position, shape and so forth of the above-described constitution members are not limited to the above-described embodiments, and can be made to be the number, position and shape and so forth which are preferable in working the present invention. Moreover, in each drawing, the same reference numeral is added to the same constitution element.

Summarizing the above-described embodiments, by using the video image signal of the interlace system and detecting motion information representing a moving picture/a still picture, and conducting display control for a display scan of an image data based on a detection signal of this motion information, in case of displaying the video image signal of the interlace system as a moving picture image by means of the progressive scanning system, since, when it is displayed, an information data of the motion can be output for every frame, visually smooth motion is maintained. Also, in case of displaying the video image signal of the interlace system as a still picture image by means of the progressive scanning system, since all information of an odd field and an even field can be displayed as a double speed frame information data, there is an advantage that a displayed image or character is clear and that a break of a character and a line missing do not occur.

In the present invention, in case of displaying the video image signal of the interlace system as a moving picture image by means of the progressive scanning system, since, when it is displayed, an information data of the motion can be output for every frame, visually smooth motion is maintained. Also, in case of displaying the video image signal of the interlace system as a still picture image by means of the progressive scanning system, since all information of odd and even fields can be displayed as a double speed frame information data, a displayed image or character is clear, and a break of a character and a line missing do not occur.

Also, it is possible to provide the image display processing apparatus and the image display processing method, in which a still picture having high resolution can be easily obtained, and even in a display by means of the progressive scanning system, smoothness of a moving picture image cannot be lost. In other words, in case of displaying the video image signal of the interlace system by means of the progressive scanning system, it is possible to provide the progressive scanning image display processing apparatus and image display processing method, in which a still picture having high resolution can be obtained, and even in a display by means of the progressive scanning system, smoothness of a moving picture image cannot be lost.

Furthermore, by using the video image signal of the interlace system and detecting motion information representing a moving picture/a still picture, and conducting display control for a display scan of an image data based on a detection signal of this motion information, it becomes to be possible to display a still picture without flicker and without losing display resolution for not only a moving picture but also a still picture. Further, when a moving picture is displayed, line interpolation is enhanced, and it becomes to be possible to smoothly display a motion of a frame image.

The entire disclosure of Japanese Patent Application No. 10-338419 filed on Nov. 13, 1998 including specification, claims, drawing and summary are incorporated herein by reference in its entirety.

What is claimed is:

1. An image processing display apparatus for converting an image signal of an interlace system into a progressive scanning system and displaying an image, comprising:
    means for conducting low band frequency pass processing so as to reduce flicker for a vertical direction signal component of a still picture signal component included in a video image signal; and
    means for synthesizing a still picture signal component to which said low band frequency pass processing is applied and a moving picture signal component included in said video image signal to generate a progressive signal.

2. An image processing display apparatus for converting an image signal of an interlace system into a progressive scanning system and displaying an image, comprising:
    an image data memory processing section for generating a graphics image signal which is used for a display screen;
    a motion detecting circuit section for detecting motion information of a moving picture signal included in a video image signal of an interlace system, which is provided from an external device;
    a vertical direction low-pass filter for selecting a still picture signal included in said video image signal based on said motion information, and conducting predetermined low band frequency pass processing so as to reduce flicker for a vertical direction signal component of said selected still picture signal and generating a progressive signal;
    a scan line switch for selectively switching said still picture signal output from said vertical direction low-pass filter and a moving picture signal which does not pass through said vertical direction low-pass filter to each other based on said motion information, and outputting it;
    a synthesis section for synthesizing a still picture signal output from said scan line switch and a moving picture signal output from said scan line switch to generate a progressive signal; and
    a display section for displaying said synthesized and generated progressive scan signal.

3. An image processing display apparatus according to claim 2, wherein said motion detecting circuit section comprises:
    means for making a video signal field screen data generated by using said video image signal to be a unit frame, and conducting difference processing of a current frame that is an up-to-date frame and a frame by one frame before from said current frame and generating one frame interval difference signal, and for conducting difference processing of a frame by one frame before from said current frame and a frame by two frames before from said current frame and generating one frame interval difference signal; and
    means for detecting said motion information using two of said one frame interval difference signal.

4. An image processing display apparatus according to claim 3, comprising:
    a memory for an image which stores said current frame;
    a memory for an image which stores a frame by one frame before from said current frame;
    a memory for an image which stores a frame by two frames before from said current frame;
    two low frequency pass filters for conducting predetermined low band frequency pass processing so as to remove a predetermined color signal component from each of said two of one frame interval difference signal; and
    a synthesis section for synthesizing said motion information using an output from one of said low frequency pass filters and an output from the other of said low frequency pass filters.

5. An image processing display apparatus according to claim 4, wherein each of said two low frequency pass filters includes means for conducting said predetermined low band frequency pass processing so as to remove said predetermined color signal component for a horizontal frequency signal component and a vertical frequency signal component of said one frame interval difference signal which is input to each filter.

6. An image processing display apparatus according to claim 2, wherein said vertical direction low-pass filter has a transversal type finite impulse response filter having a predetermined number of taps.

7. An image display processing method of converting an image signal of an interlace system into a progressive scanning system and displaying an image, comprising steps of:
    conducting predetermined low band frequency pass processing so as to reduce flicker for a vertical direction signal component of a still picture signal component included in a video image signal; and
    synthesizing a still picture signal component to which said low band frequency pass processing is applied and a moving picture signal component included in said video image signal to generate a progressive signal.

8. An image display processing method of converting an image signal of an interlace system into a progressive scanning system and displaying an image, comprising:
    an image data memory step of generating a graphics image signal which is used for a display screen;
    a motion detecting step of detecting motion information of a moving picture signal included in a video image signal of an interlace system, which is provided from an external device;
    a vertical direction low band frequency pass processing step of selecting a still picture signal included in said video image signal based on said motion information, and conducting predetermined low band frequency pass processing so as to reduce flicker for a vertical direction signal component of said selected still picture signal and generating a progressive signal;

a scan line switch step of selectively switching said still picture signal to which said vertical direction low band frequency pass processing is applied and a moving picture signal to which said vertical direction low band frequency pass processing is not applied to each other based on said motion information, and outputting it;

a synthesis step of synthesizing said selectively outputted still picture signal and said selectively outputted moving picture signal to generate a progressive signal; and a display step of displaying said synthesized and generated progressive signal.

9. An image display processing method according to claim 8, wherein said motion detecting step comprises steps of:

making a video signal field screen data generated by using said video image signal to be a unit frame, and conducting difference processing of a current frame that is an up-to-date frame and a frame by one frame before from said current frame and generating one frame interval difference signal, and conducting difference processing of a frame by one frame before from said current frame and a frame by two frames before from said current frame and generating one frame interval difference signal; and detecting said motion information using two of said one frame interval difference signal.

10. An image display processing method according to claim 9, comprising:

a first memory step for an image which stores said current frame;

a second memory step for an image which stores a frame by one frame before from said current frame;

a third memory step for an image which stores a frame by two frames before from said current frame;

two low band frequency pass processing steps including a predetermined low band frequency pass processing step so as to remove a predetermined color signal component from each of said two of one frame interval difference signal; and a synthesis step of synthesizing said motion information using an output from one of said low band frequency pass processing steps and an output from the other of said low band frequency pass processing steps.

11. An image display processing method according to claim 10, wherein each of said two low band frequency pass processing steps includes said predetermined low band frequency pass processing step so as to remove said predetermined color signal component for a horizontal frequency signal component and a vertical frequency signal component of said one frame interval difference signal which is input to each step.

12. An image display processing method according to claim 8, wherein said vertical direction low band frequency pass processing step conducts processing by means of a transversal type finite impulse response filter having a predetermined number of taps.

* * * * *